United States Patent Office 3,236,312
Patented Feb. 22, 1966

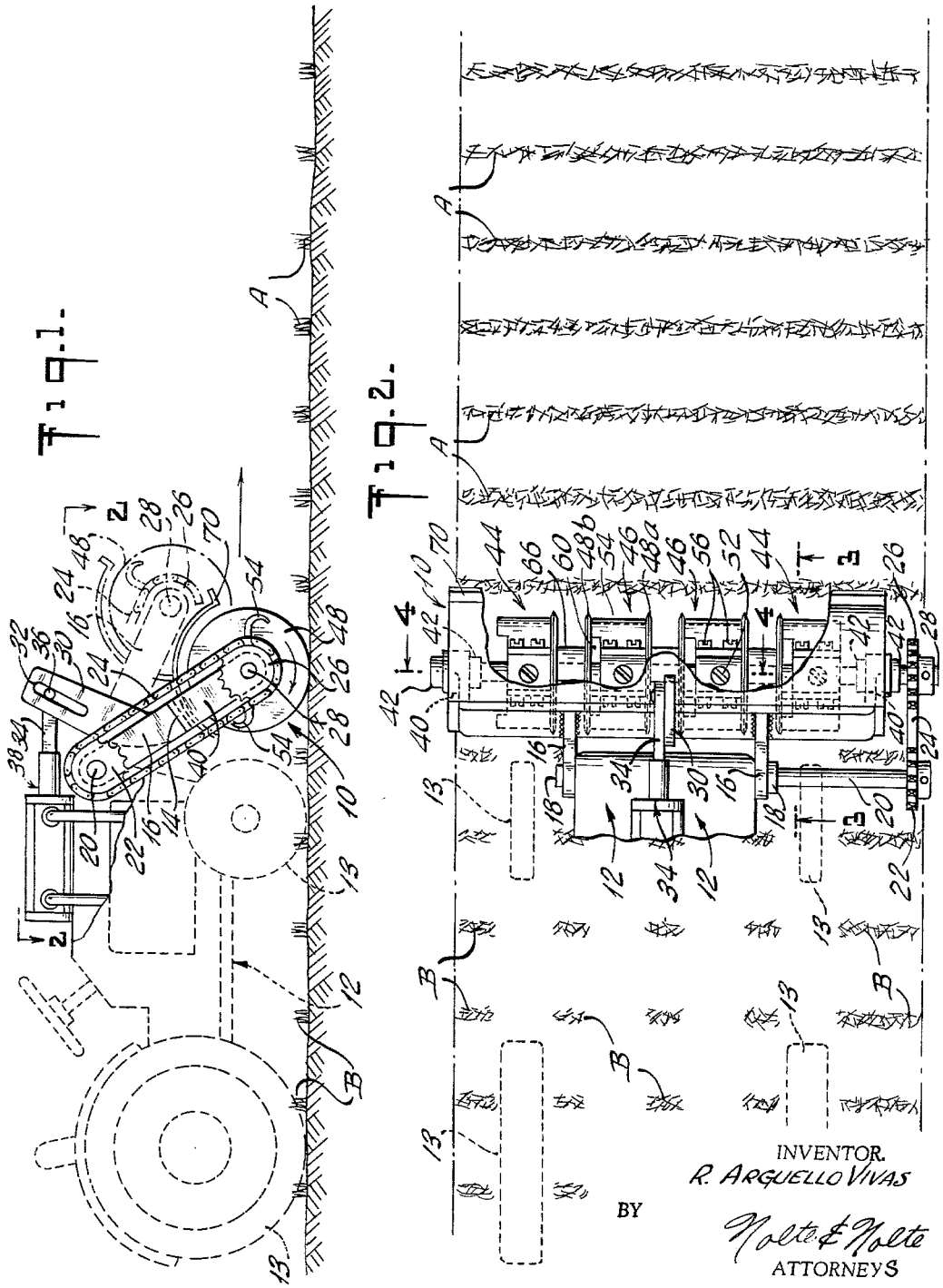

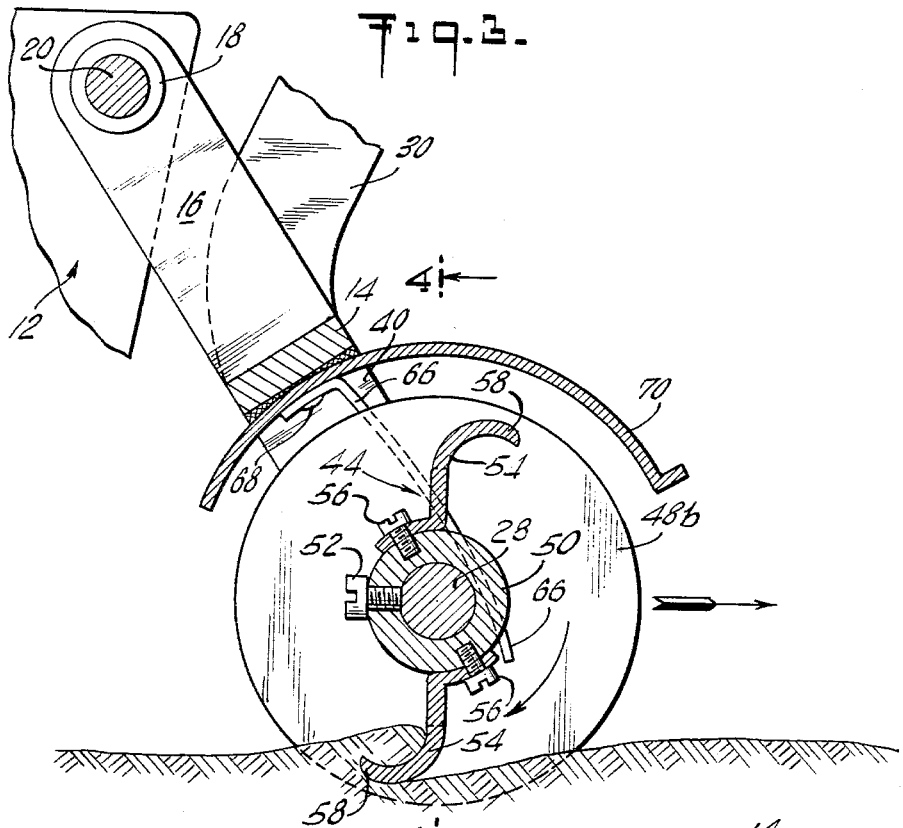
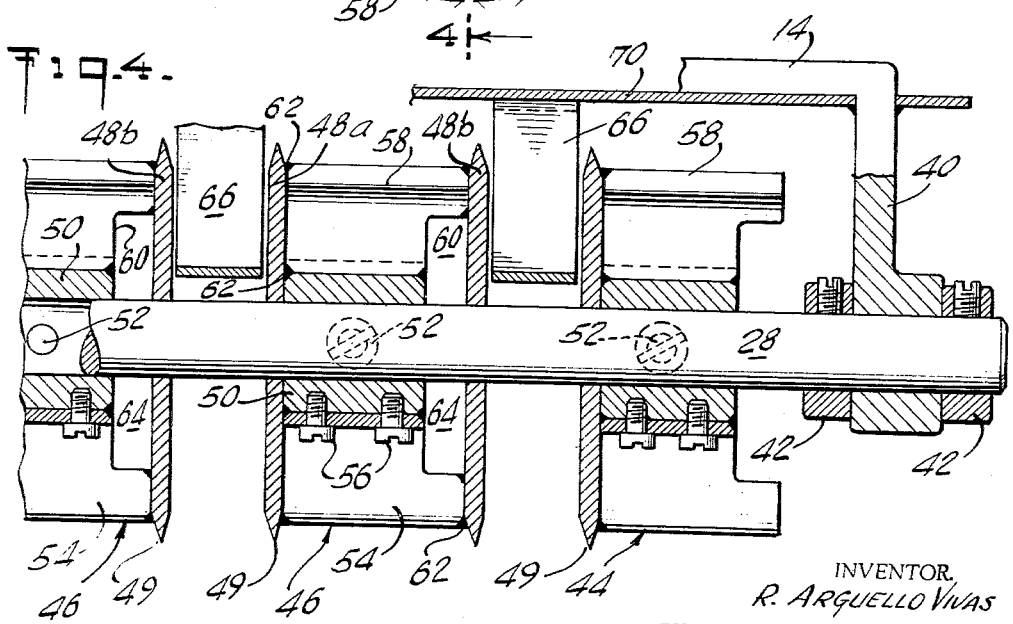

3,236,312
ROTARY EARTH MOVING APPARATUS
Rodolfo Arguello Vivas, Apartado Postal 505,
Managua, Nicaragua
Filed July 2, 1964, Ser. No. 379,982
3 Claims. (Cl. 172—39)

The present invention relates to cultivators which are adapted to dig into and turn over rows of earth, for various purposes such as thinning out plants, and the like.

A primary object of the present invention is to provide a cultivator of this type which is simple and inexpensive while at the same time being quite rugged and being capable of quickly and efficiently turning over elongated rows of earth while the cultivator advances at a fairly high rate of speed.

Another object of the present invention is to provide a cultivator of this type which can be made up of individual components of relatively thin sheet metal or the like, for example, while at the same time having these components assembled in such a way that they form a very rugged, strong structure.

In addition, it is an object of the invention to provide a cultivator of the above type which will not become clogged up with earth and which will reliably raise and drop the earth during cultivation thereof without causing earth, even if it is quite damp, from clinging in large clumps to the cultivator, eventually making cleaning thereof essential, which of course means stopping the operations.

It is also an object of the present invention to provide a cultivator of the above type which can have its components easily assembled and disassembled.

Also, the object of the present invention includes a cultivator of the above type which is of relatively light weight and which at the same time is capable of penetrating to the desired extent into the earth to cultivate the earth to the desired depth.

Furthermore, it is an object of the invention to provide a cultivator of the above type with a construction which will reliably prevent clumps of earth, rocks, and the like from being thrown upwardly to an extent which would permit them to injure parts of a tractor or the operator thereof.

Primarily, the structure of the invention includes a rotary shaft and a plurality of earth-scooping units carried by and distributed along the shaft for rotation therewith so that these scooping units will respectively cultivate rows of earth while the shaft rotates and is advanced along the path across which the shaft extends. The scooping units of the invention include a plurality of scooping members distributed circumferentially about the shaft and having distant therefrom ground-engaging edges which dig into the earth to scoop up portions thereof while the shaft rotates. These latter edges of the scooping members extend substantially parallel to the shaft, and the assembly includes elements which are united together in such a way that an extremely rugged construction is formed from relatively thin, light elements and also the earth is compelled to drop freely away from the structure so that there will be no clogging thereof.

The invention is illustrated by way of example in the accompanying drawings which form part of the application and in which:

FIG. 1 is a side elevation showing the cultivator of the invention attached to a tractor and ready to perform the cultivating operations when the tractor of FIG. 1 travels to the right, as viewed in FIG. 1;

FIG. 2 is a top plan view of the structure of FIG. 1 taken along the line 2—2 of FIG. 1 in the direction of the arrows;

FIG. 3 is a transverse sectional view, taken along line 3—3 of FIG. 2 in the direction of the arrows, and showing on an enlarged scale, as compared to FIGS. 1 and 2, details of the cultivator structure of the invention; and FIG. 4 is a longitudinal sectional view taken along lines 4—4 of FIGS. 2 and 3, in the direction of the arrows, and showing additional details of the structure of the invention.

Referring now to the drawings, the cultivator 10 of the invention is shown in FIGS. 1 and 2 carried by a tractor 12. Part of the cultivator is formed by an elongated horizontally extending supporting bar 14 which has a pair of upwardly extending bars 16 fixed thereto, and these bars 16 are supported at their upper ends for rotary movement on a pair of coaxial bearing members 18 which are fixed to the tractor at an upper portion of the front end thereof, as indicated in FIGS. 1 and 2. Thus, the entire supporting bar 14 is supported for rotation about the horizontal axis formed by the pair of coaxial tubular bearings 18. The engine of the tractor drives in a known way a rotary drive shaft 20 which extends through one of the bearings 18 to one side of the tractor at the front thereof and this drive shaft 20 fixedly carries at its outer end a sprocket wheel 22 which drive an endless sprocket chain 24 which transmits the drive from the sprocket wheel 22 to a second sprocket wheel 26 which is fixed to an end of a rotary shaft 28 of the cultivator of the invention.

Between the supporting elements 16, the bar 14 is fixed to an upwardly extending rigid plate 30 formed with an elongated slot 32, and an elongated piston member 34 carries a cross-pin 36, or the like, which extends into the slot 32, this piston member 34 forming part of a hydraulic adjusting unit 38 which is also well known in the art and which can be controlled by the operator so that by shifting the piston 34 to the left, as viewed in FIG. 1, the entire structure can be swung about the common axis of the bearings 18 up to an inoperative position shown in dotted lines in FIG. 1, permitting the tractor to move easily about, while when cultivating operations are to be carried out piston 34 is advanced to the right, as viewed in FIG. 1, lowering the cultivator 10 so that it will engage the ground and perform the cultivating operations along predetermined rows in a manner described below.

Referring now to FIG. 4, it will be seen that the supporting bar 14 has at its ends a pair of elongated end portions 40 which extend substantially perpendicularly to the remainder of the bar 14, and these end portions 40 are formed with aligned coaxial openings which receive the ends of the shaft 28, as is apparent from the right end of the structure which is shown in FIG. 4, the left end being an identical mirror image of the structure shown at the right end of FIG. 4. A pair of collars 42 are fixed to the shaft 28 on opposite sides of the element 40 so that the shaft 28 is free to turn relative to the bar 14 but cannot move axially with respect thereto.

Distributed along and fixed to the shaft 28 for rotation therewith are a plurality of scooping units which include a pair of end scooping units 44 and a plurality of intermediate scooping units 46 situated therebetween. The spacing of these earth-scoping units 44 and 46 is such that, while the shaft 28 rotates and is advanced along a path across which the shaft extends, the scooping units will cultivate elongated rows of earth and may be used for thinning out rows of plants. Thus, as may be seen from FIG. 2, the rows of plants A are thinned out by the scooping units 44 so as to leave thinned rows B, as shown at the left in FIG. 2. The wheels 13 of the tractor 12 are in line with a pair of scooping units 44.

Each of the intermediate scooping units 46 includes a pair of parallel discs 48a and 48b which are perpendicular to the shaft 28 and through which the shaft 28 passes, the shaft 28 passing through the centers of the discs 48a and 48b. Situated between the discs of each unit 46 is a tubular hub 50 through which the shaft 28 also passes, and it will be noted that the hub 50 has a length which is shorter than the distance between the pair of discs 48a and 48b. The hub 50 is fixed by a screw member 52 (FIG. 3) to the shaft 28 for rotation therewith.

A pair of scooping members 54 form part of each unit, although any desired number of scooping members may be provided, and as is apparent from FIG. 3 these scooping members are uniformally distributed circumferentially about the shaft 28. At their inner ends the scooping members 54 are fixed by screws 56 to the hub 50 while the scooping members have at their outer ends free elongated ground-engaging edges 58 which extend substantially parallel to the shaft 28 and which are adapted to dig into the earth during rotation of the shaft 28, as is apparent from FIG. 3. As may be seen from FIG. 3 the shaft 28 is rotated in a clockwise direction, as viewed in FIG. 3, so that concave faces of the scooping members will advance downwardly toward the earth with the edges 58 digging into the earth to scoop up portions of the earth while the shaft 28 rotates and is advanced to the right, as viewed in FIG. 3.

As is apparent particularly from FIG. 4, the right edges of the scooping members, as viewed in FIG. 4, have lateral edge portions 60 which do not extend all the way up to the disc 48b. The side edge portions in the region of the edges 58 do however extend up to the disc 48b, and along their side edges the scoop members 54 are welded, as shown at 62, to the side faces of the discs 48a and 48b, and as a result of this feature the discs together with the scoop members and the hub form a rigid strong unit even though these elements are made of relatively thin sheet metal, or relatively thin plates of steel, for example.

The relatively small thickness of plates 48a and 48b, which have fairly sharp or rounded edges 49, enables them to slice into the earth and provide sharply defined cultivated rows.

Because the edge portions 60 of the scooping members are spaced from the disc 48b, these edge portions together with the shorter hub 50 define an opening 64 with the inner face of the disc 48b. As a result of the opening 64, which is shown most clearly in FIG. 4, the earth as it is scooped up is not necessarily compelled to remain in the scoop members and to drop therefrom after they pass over the top of the shaft 28. Instead the earth is free to spill downwardly through the opening 64.

Moreover, the bar 14 fixedly carries, at its portion which extends parallel to the shaft 28, a plurality of elongated springy strip members 66 which respectively extend between the spaces between the several units 44 and 46, and it will be noted that the outer faces of the discs 48a and 48b are directed toward the strips 66. As a result of this feature any dirt which happens to cling to the outer faces of the discs 48a and 48b will be removed from the discs to drop down, and in this way undesirable clinging of clumps of earth to the apparatus is reliably avoided.

As may be seen from FIG. 3, the springy disc-cleaning strips 66 are fixed to the bar 14 by fastening members 68, and these fastening members 68 also serve to fix to the horizontal portion of the bar 14 an elongated cover member 70 which is transversely curved, as indicated in FIG. 3, so as to have the form of an elongated inverted trough. The concave face of the cover 70 extends around the upper portions of the discs 48a and 48b in the manner shown in FIG. 3, so that if there is a tendency for any clumps of earth or stones or the like to be thrown upwardly by the structure they will engage the cover 70 and fall back down without causing any injury to any equipment or personnel.

It is to be noted that the end units 44 are identical with the intermediate units 46 except that these end units do not have outer end discs. Otherwise the structure of the end units 44 is precisely the same as the structure of the intermediate units 46.

As is apparent from FIG. 4, it is a simple matter to assemble and disassemble the structure of the invention. Thus, once the end collars 42, which are located outwardly beyond the ends 40 of the bar 14, are removed, the shaft 28 can be slipped out of one of the end portions 40 toward the other end portion to a distance sufficient to permit the end units 44 to be removed from the shaft. Once the shaft 28 is slipped out of one of the ends 40 of the bar 14, after the screws 52 have been loosened, it is a simple matter to slip the shaft 28 out through all the rest of the units which are maintained separated from each other at this time by the elongated springy strips 66, so that in this way it is very simple to quickly and easily disassemble as well as reassemble the structure.

The manner in which the cultivator operates is shown best in FIGS. 1 and 3. In order to transport the cultivator to a desired location it is held in the raised, dotted-line position, shown in FIG. 1. When it is brought to a location where the cultivating operations are to be carried out, it is lowered to the position shown in FIG. 1, and of course the drive is then transmitted to the shaft 28. As may be seen from FIGS. 1 and 3, and in particular FIG. 3, the outer peripheral edge of the discs 48a and 48b extend beyond the outermost portion of the scoop member 54. Therefore while the shaft 28 is driven the peripheral edges of the discs will slice into the earth, and then of course the edges 58 will dig into the earth, as indicated in FIG. 3. The operator does not advance the tractor during the initial operation so that the discs will slice into the earth and the scoop members will dig into the desired depth of cultivation, and when the desired depth of cultivation is reached the tractor is advanced at a rate which will permit rows of earth to be cultivated in a highly efficient manner.

It is to be noted that with this construction the discs of each unit provide sharply defined cultivated rows since they slice perpendicularly into the earth while the strips 66 between the several units will guarantee that if any of the earth between the cultivated rows is picked up it will be reliably removed from between the discs. In this way the structure of the invention can provide very sharply defined rows of cultivated earth. Important: This apparatus should be used before beginning any cultivation.

What is claimed is:

1. In a cultivator, an elongated rotary shaft, means for producing rotation in said shaft, a plurality of scooping units fixed to and distributed along said shaft, said units including a pair of end units and a plurality of intermediate units situated therebetween, all of said units being spaced from each other for cultivating rows during rotation of said shaft while said shaft is advanced along a path across which said shaft extends, each of said intermediate units including a pair of parallel discs perpendicular to said shaft and through which said shaft extends, a hub situated between said discs and through which said shaft extends, said hub being shorter than the distance between said discs and fixed to one of said discs, and a plurality of earth-scooping members fixed to said hub and respectively having side edges fixed to said one disc, each of said scooping members extending at portions distant from said hub laterally beyond the latter into engagement with the other of said discs and said portions of said scoop members terminating in side edges which are fixed to said other disc, said hub and scoop members defining with said other disc an opening through which earth may fall, and said hubs being fixed to said shaft for rotation therewith, said end scooping units including a single disc a hub fixed to said inner disc and extending therefrom away from said intermediate units, said latter hub being fixed to said shaft, and a plurality of earth-scooping members fixed to said latter hub and having side edges fixed to said disc of each of said end units, said scooping members of said end units being substantially identical with those of said intermediate units.

2. In a cultivator as recited in claim 1, an elongated support bar having a pair of end portions extending substantially perpendicularly from the remainder of said support bar and carrying said shaft at portions thereof located beyond said end units, and a plurality of elongated strips fixed to said bar at said remainder thereof and projecting into the spaces between said units for engaging said discs at faces which are directed away from said scooping members so as to prevent dirt from clinging to the latter faces of said discs and for maintaining a given distribution of said discs along said shaft.

3. In a cultivator as recited in claim 2, an elongated cover member also carried by said remainder of said bar located over said scooping units, and situated between said strips and said bar.

References Cited by the Examiner

UNITED STATES PATENTS

| | | | |
|---|---|---|---|
| 154,489 | 8/1874 | Jones | 172—39 |
| 617,070 | 1/1899 | Anderson | 172—547 |
| 736,279 | 8/1903 | Lorenz | 172—548 |
| 888,103 | 5/1908 | Liebhart | 172—120 X |
| 1,258,109 | 3/1918 | Goeldner | 172—548 X |
| 2,310,735 | 2/1943 | Greer | 172—555 X |
| 2,465,488 | 3/1949 | Sears et al. | 172—39 |
| 2,669,819 | 2/1954 | Sawyer | 172—276 X |
| 2,669,919 | 2/1954 | Freeman | 172—39 |
| 2,764,925 | 10/1956 | Kalla et al. | 172—549 |
| 3,120,279 | 2/1964 | Horowitz | 172—123 X |

FOREIGN PATENTS

| | | |
|---|---|---|
| 341,808 | 10/1921 | Germany. |
| 92,529 | 10/1958 | Norway. |

ABRAHAM G. STONE, *Primary Examiner.*